PATCHBOARD PROGRAMMING SYSTEM

Filed Oct. 31, 1966 Sheet 1 of 2

INVENTOR
MICHAEL RUOTOLO
BY E. S. Lovette
ATTORNEY

March 11, 1969 M. RUOTOLO 3,432,801

PATCHBOARD PROGRAMMING SYSTEM

Filed Oct. 31, 1966 Sheet 2 of 2

INVENTOR
MICHAEL RUOTOLO
BY E. S. Lovette
ATTORNEY

United States Patent Office
3,432,801
Patented Mar. 11, 1969

3,432,801

PATCHBOARD PROGRAMMING SYSTEM

Michael Ruotolo, Huntington, N.Y., assignor to Dynamics Corporation of America, New York, N.Y., a corporation of New York Filed Oct. 31, 1966, Ser. No. 590,680
U.S. Cl. 339—126 4 Claims
Int. Cl. H02b *1/02;* H01r *25/00, 29/00*

ABSTRACT OF THE DISCLOSURE

An electrical patchboard which includes a conductive plate having first and second arrays of parallel slots disposed on opposite sides of the conductive plate with the arrays of slots being mutually perpendicular to each other and recessed to a depth sufficient to form a matrix of holes through which are inserted electrical connectors having insulated sleeve portions shaped to form press fits between the parallel walls of at least one of the first or second arrays of slots.

This invention relates to apparatus and processes for an improved patchboard programming system and more particularly to apparatus and processes concerning holes in a patchboard panel.

A patchboard, also known as a patch bay, is a device whereby a plurality of plugs connected to a first plurality of circuits may selectively connect with a plurality of connectors connected to a second plurality of circuts. Patchboards are used, for example, in telephone switching systems and electronic computers.

The patchboard programming system consists of two mating panels. One is attached to the computer and the other, called the portable panel, is removable. The portable panel has a matrix of holes in which a large number of connector plugs may be removably inserted. It is possible to program the computer by inserting the proper plugs in selected holes at a location remote from the computer. At the same time the computer may be operated with a different program arranged on another portable panel, saving costly computer time. This general type of patchboard programming system is further described in U.S. Patent No. 2,647,244 to Dewey and Zatsky, issued July 28, 1953.

One major problem in the manufacture of patchboards has been to maintain the proper alignment of each contact and the proper spacing between the contacts. For example, a simple patchboard may consist of a rectangular matrix 30 contacts high and 60 across, for a total of 1800 contacts. Unless the individual contacts are accurated aligned and spaced, they will fail to make electrical contact.

The problem of accurate placement of many contacts at a reasonable cost has been solved in unshielded patchboard programming systems. Such contacts, consisting of metal springs or prongs, may be positioned in the form of a matrix and placed in a rigid, molded plastic frame. However, the problem is more difficult in patchboards for use with shielded coaxial cable. Such cable consists of an inner conductor, an insulator, and an outer conductor. The termination for such cable consists of a conductive connector, insulation around the conductor, and the patchboard panel, which is conductive.

It has not been possible, heretofore, to make a patchboard for use with coaxial cable which possesses the required accuracy at a reasonable cost. One known method is to drill individual round holes in a conductive metal panel in a sequence to obtain a matrix of a thousand or more holes. This process is necessarily slow and relatively costly even with programmed machine tools. The connectors positioned in the holes consist of a metal prong surrounded by a round shank of plastic insulation. Due to their round shape, they tend to rotate and become incorrectly aligned.

Another known patchboard is made up of a large number of individual cells. Each cell consists of a spring contact surrounded by rectangular plastic insulation. The cells are fitted into openings formed by interlocking metal grids, the interlocking being formed like an "egg carton." As the cells and metal grid members are assembled, they may build up tolerance variations. For example, if more of the cells in the first part of one row are oversized and the cells later in the row undersized, the overall dimension of the row may be correct and yet contacts near the center may be out of position. This assembly, due to the need for hand fabrication and constant tolerance checking, is relatively expensive to manufacture.

The present invention overcomes the difficulties of the prior devices by providing a highly accurate and relatively inexpensive patchboard panel. The panel is machined of metal, preferably on a high-accuracy milling machine. The machining forms a set of parallel grooves having raised ribs running one way on the first surface of the panel and similar parallel grooves running at an angle to the first set and cut into the opposite surface. Preferably the grooves in one surface are perpendicular to the grooves in the other surface. The total depth of the crossing or perpendicular grooves is greater than the thickness of the panel. Accordingly, the crossed grooves form four-sided polygonal holes. A plurality of conductive spring fingers each surrounded by insulating material, preferably plastic insulation, are force-fitted into the polygonal holes. These spring fingers form a set of non-removable shielded contacts on the fixed panel. They cooperate with a set of removable coaxial plugs inserted into a mating, portable panel to complete a plurality of circuits of the patchboard programming system.

It is therefore a principal objective of the present invention to provide a relatively inexpensive patchboard system in which the contacts are very accurately aligned and positioned.

It is a further objective to shield each individual connector within the system so that the connectors may be used with coaxial cable.

It is a further objective to provide correct orientation for the connectors so that they make good electrical contact with their mating plugs.

It is an additional object to provide an improved method for the manufacture of patchboards.

Other objects and features will become apparent from the description taken in conjunction with the drawings, in which.

Figure 1:
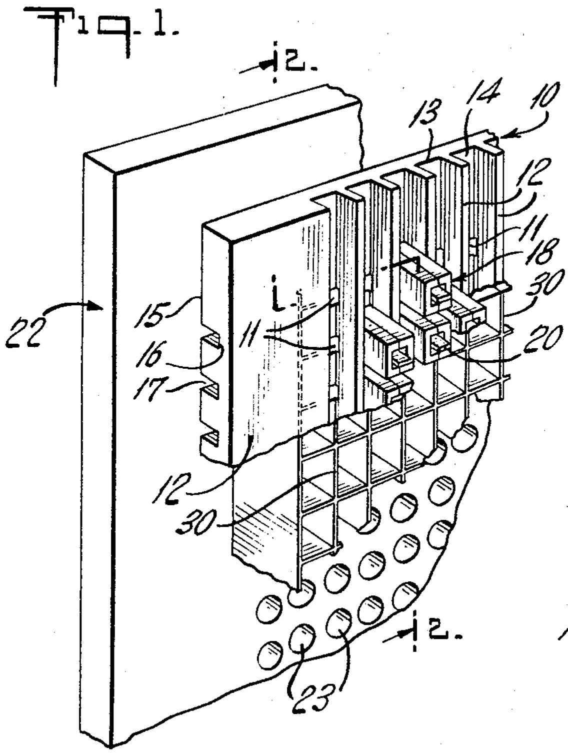
FIG. 1 is a pictorial perspective partly cut-away view of a portion of the patchboard system.

FIGS. 1–5 show an electrically conductive fixed rear panel 10 with a plurality of polygonal rectangular holes 11. Holes 11 are produced by a novel and inexpensive process. Prior to machining, panel 10 may be a flat metal plate having flat surfaces 12 and 15. A first surface 12 is machined or milled, for example, to a first depth 13 producing a first set of parallel slots 14 having upstanding ribs between the slots. The depth and position of the slots may be machined, or otherwise fabricated, to an accuracy of 0.005 inch using, for example, conventional milling machines. Opposing surface 15 is likewise machined to a second depth 16 producing a second set of parallel slots 17 and ribs which are, preferably, perpendicular to the slots 14 and ribs of the first surface. Holes 11 are produced by the sum of depths 13 and 16 being greater than the distances between surfaces 12 and 15. Preferably each of the slots exceeds in depth one-half the thickness of the panel 10. Alternatively, one set of slots on one surface may have greater depth than the other set, as long as the total depth of the two cuts exceeds the thickness of the plate so as to produce polygonal holes 11 at the intersections of slots 14 and 17.

Slots within a particular set 14 or 17 are preferably parallel to each other and of uniform cross-section. Holes 11 are rectangular because slot sets 14 and 17 are perpendicular to each other. If desired some other quadrilateral shape of a suitable angle between slot sets 14 and 17 may be chosen.

Figures 5, 6, 7, 8, 9:
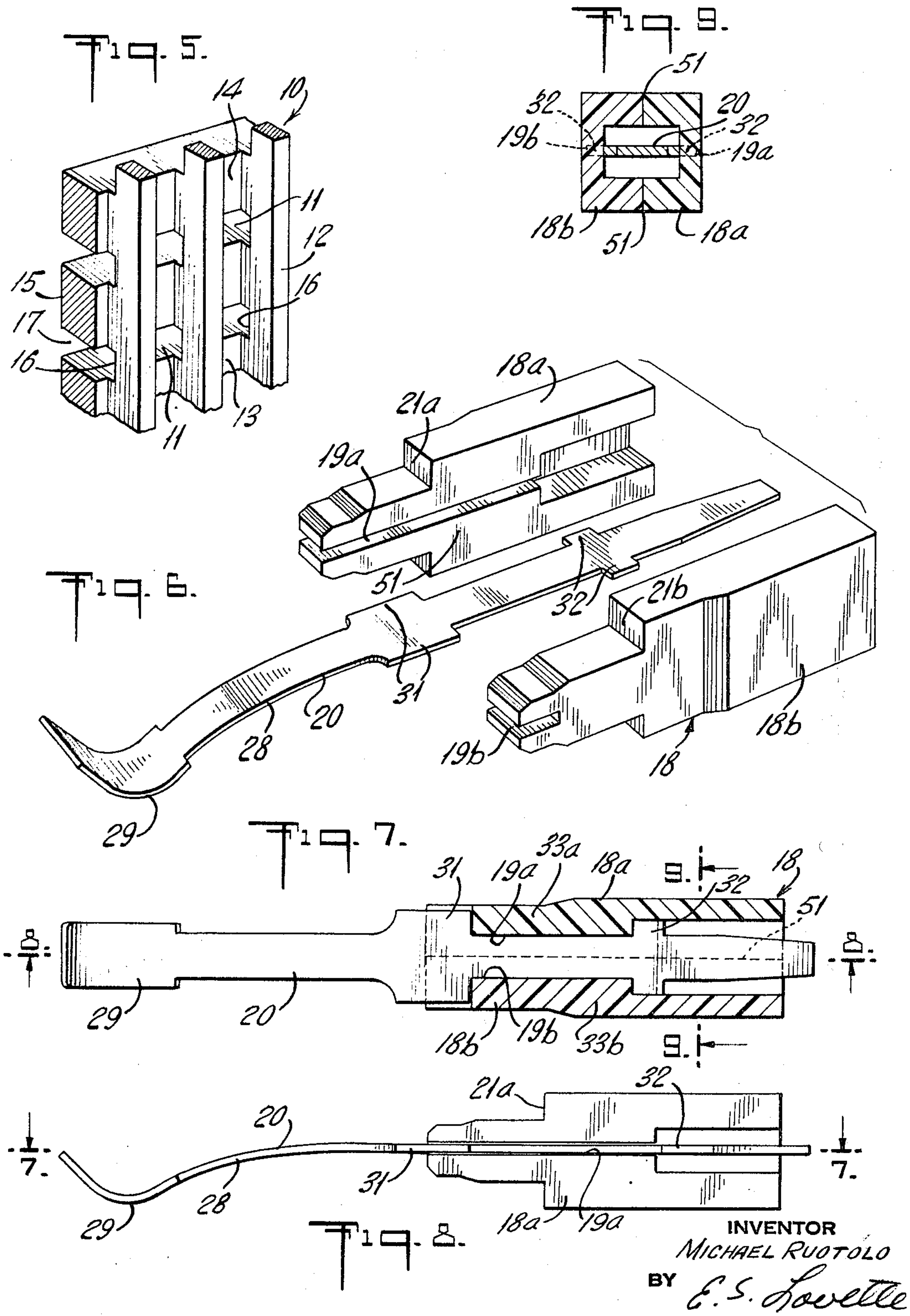
FIG. 5 is a perspective view of a portion of the fixed panel.
FIG. 6 is a perspective exploded view showing how a conductive spring contact mounts in an insulating block.
FIG. 7 is a top cross-sectional view taken along lines 7—7 of FIG. 8 showing the spring contact mounted in an insulating block.
FIG. 8 is a side cross-sectional view taken along lines 8—8 of FIG. 7.
FIG. 9 is a back cross-sectional view taken along lines 9—9 of FIG. 7.

The construction of the individual connectors, and their insulation, is shown in FIGS. 6–9. As is shown in FIG. 6, insulating block 18 is made up of two identical and complementary sections **18*a* and 18*b* having slots 19*a* and 19*b*, respectively. The connector spring finger 20 is of a conductive spring material; for example, beryllium copper. Spring finger 20 includes a bend 28 and a detent 29 to give a press force and to make contact with its mating prong. Spring finger 20 also includes protruding portions 31 and 32 provided for interlocking with the recessed shoulders of corresponding portions 33*a* and 33*b* of the block 18**.

Figure 3:
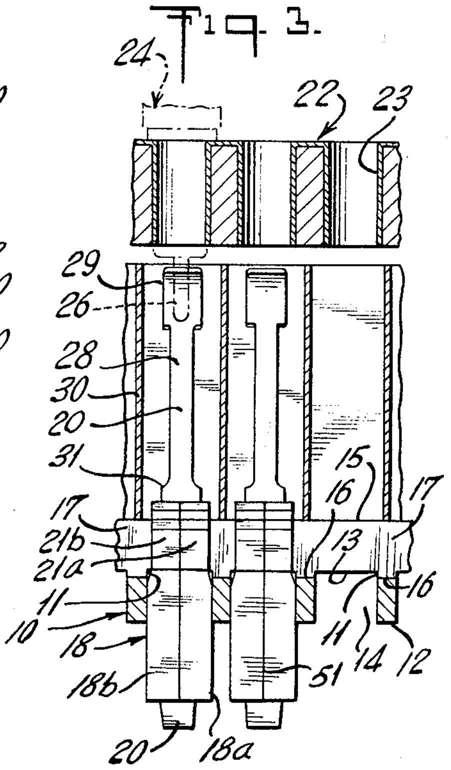
FIG. 3 is a top cross-sectional view taken along lines 3—3 of FIG. 2 with parts shown in elevation.
Figures 2, 4:
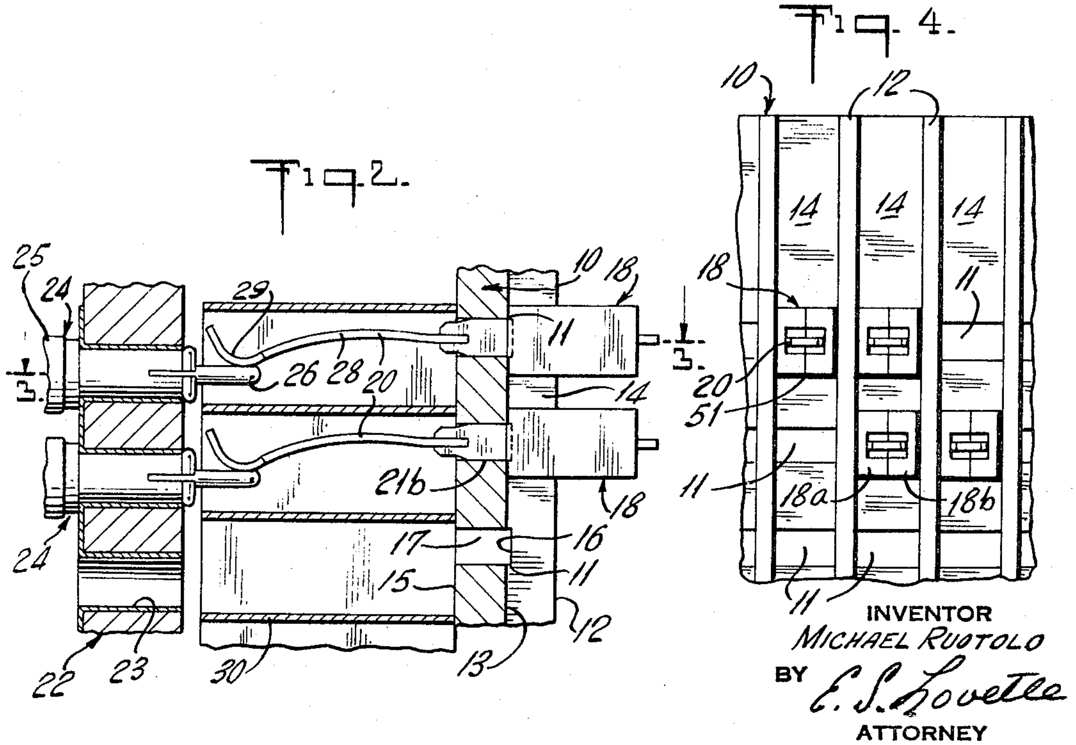
FIG. 2 is a side cross-sectional view of two circuits of the system of FIG. 1 taken along lines 2—2 with two patch plugs and two contacts making electrical connection.
FIG. 4 is a plan view of a portion of the rear of the fixed panel.

In the assembly of the spring finger and its insulation, the electrical contact of spring finger 20 is first fitted into one slot, say **19*b*. Then section 18*a* is positioned next to section 18*b* and spring finger 20 is positioned in slot 19*a*. Alternatively, block 18 may be molded of plastic in one piece with the spring finger 20 molded in place, or molded in one piece, and then the spring finger 20 inserted into its flat opening. Preferably block 18 has a cross-section slightly larger than holes 11 and is press fitted into holes 11 from the back of panel 10. The press fitting extrudes or distorts the plastic of block 18 so that the block is firmly held in place. Block 18 may, alternatively, be held in place by other methods, such as adhesive bonding. Steps 21*a* and 21*b* on block 18 prevent it from being pulled forwardly from panel 10. Block 18 may be made of any insulating material, preferably a plastic such as a polymer of caprolactam such as nylon capable of being press fitted into holes 11 and held firmly in place by the crossed ribs of the panel around those holes. Economy of design also suggests making block 18 of two molded and identical half sections 18*a* and 18*b* each having faces 51 for mutual juxtaposed mating upon assembling the pair of sections together on spring finger 20. The press fit of this assembly in hole 11 maintains the sections in interlocking relation. FIGS. 2 and 3 show only two blocks 18 and fingers 20 in place; however, there will usually be a block 18 and finger 20 for each of the holes 11. The rear end of spring finger 20 extends beyond panel 10 and is adapted to be connected to a mating connector (not shown). A suitable mating connector may be in the shape of a partial channel member which is forced over the rear end of spring finger 20**.

FIG. 1 shows a portable second panel 22 which has holes 23 corresponding to holes 11 and is removably positioned near panel 10. Some of the holes 23 are removably filled with coaxial jack plugs 24. Each of the plugs 24 has an outer shell connected to the outer conductor of a coaxial cable (not shown). The conductive prong 26 of plug 24 is connected to the inner conductors of the coaxial cable. A suitable coaxial jack plug is described in U.S. Patent 2,983,895, to Pasik, issued May 9, 1961. Preferably, panel 22 is conductive so that the surface defining hole 23 makes contact with outer conductive shell 25 of plug 24. Panel 22, in that case, would be a grounded plate and would act to ground the outer conductive shell 25 of the plug 24.

Panel 22 may have plugs 24 already inserted into its holes 23. Therefore, when panel 22 is positioned near panel 10 it is offset downwardly and then slid up, allowing prongs 26 to contact spring fingers 20. Blocks 18 properly orient spring fingers 20 in order to make this contact.

Intermediate metal shield 30 may be used. Preferably the shield 30 is in the form of open-ended joined boxes made from interleaved sheets as in an "egg crate." Shield 30 is grounded to panel 10. Shield 30 is positioned around every prong 26 and spring finger 20 to shield each circuit from the other. The shield 30 may be notched to fit into the milled slots 17. An outer shield (not shown) similar to shield 30 may be used to surround the rear end of plugs 18 behind fixed panel 10. Such an outer shield would also be grounded to panel 10 and provide for individual shielding of the rear ends of blocks 18.

As many changes could be made in the above construction and many different embodiments of this invention could be made without departing from the scope thereof, it is intended that all matter contained in the above description or shown in the accompanying drawing shall be interpreted as illustrative and not in a limiting sense.

What is claimed is:

1. An electrical patchboard comprising in combination, (a) a conductive panel having first and second surfaces spaced apart a preselected distance, (b) a first array of parallel lengthwise slots recessed into said panel a preselected depth from said first surface for forming a first array of ribs, (c) a second array of lengthwise slots recessed into said panel a preselected depth from said second surface for forming a second array of ribs perpendicular to said first array of ribs, the sum of the depths of said first and second arrays of slots being at least equal to the thickness between said first and second panel surfaces for forming receptacle holes at the intersections of said slots intermediate said panel faces, and (d) a plurality of electrical connectors inserted through said receptacle holes, each of said electrical connectors including a flat spring conducting member one end of which is surrounded by an insulated sleeve shaped to form a press fit within at least one slot of said first or second arrays of slots.

2. The patchboard as defined in claim 1 wherein said insulated sleeve is made up of a pair of similar insulators, each of said insulators having engaging means for interlocking the assembled insulators on said flat conducting member, the width of each insulated sleeve being slightly larger than the width of each slot of said first array of slots to press fit the inserted connector between one pair of said first array of ribs for captivating same in its receptacle hole and for maintaining the connector components in assembled interlocked status.

3. An insulated electrical connector designed for insertion through a receptacle hole in a conductive patchboard having parallel walls adjacent said receptacle hole, comprising in combination, (a) a lengthwise electrical conducting member, (b) a pair of similar lengthwise electrical non-conducting insulators each having faces designed for mutual juxtaposed mating upon assembling said pair together on said conducting member, (c) means on said conducting member for interlocking said pair of insulators on said conducting member, and (d) means on said insulators for interlocking said conductor to said insulators, one of said interlocking means including serrations providing captivated engagement with the other of said interlocking means, wherein said connector is firmly interlocked upon pressed fit insertion between the parallel walls adjacent said receptacle hole.

4. The connector as defined in claim 3 wherein said insulator interlocking means includes lengthwise slots having spaced shoulders, said conducting member being flat and resilient, and the interlocking means thereof including said serrations spaced therealong on opposite sides of said conducting member for straddling the shoulders of said assembled insulator members.

References Cited

UNITED STATES PATENTS

| | | | |
|---|---|---|---|
| 920,614 | 5/1909 | McBerty | 174—137 |
| 3,337,833 | 8/1967 | Creedon | 339—14 |

FOREIGN PATENTS

| | | |
|---|---|---|
| 135,612 | 11/1933 | Germany. |

RICHARD E. MOORE, *Primary Examiner.*

U.S. Cl. X.R.

339—18, 143